United States Patent [19]

Fowler et al.

[11] 4,254,439

[45] Mar. 3, 1981

[54] FACSIMILE MID-PAGE RESTART

[75] Inventors: Raymond L. Fowler, Boulder; Timothy L. Schneider, Longmont, both of Colo.

[73] Assignee: International Business Machines Corporation, Armonk, N.Y.

[21] Appl. No.: 107,748

[22] Filed: Dec. 26, 1979

[51] Int. Cl.³ .............................................. H04N 1/36
[52] U.S. Cl. ................................... 358/265; 358/267; 358/268
[58] Field of Search ............... 358/256, 257, 264, 265, 358/267, 268

[56] References Cited

U.S. PATENT DOCUMENTS

| 2,873,315 | 2/1959 | Fricks | 358/268 |
| 3,112,361 | 11/1963 | Kubota | 358/257 |
| 3,553,370 | 1/1971 | Rosenheck | 358/267 |
| 3,582,549 | 6/1971 | Hell | 358/287 |
| 3,784,739 | 1/1974 | de Vos | 358/289 |
| 3,834,505 | 9/1974 | Fowler | 197/1 R |

Primary Examiner—Howard W. Britton
Attorney, Agent, or Firm—Homer L. Knearl

[57] ABSTRACT

The method and apparatus shown herein provide for restarting a facsimile operation after a mid-page interrupt without overlapping or splitting the image. Furthermore, this is accomplished in a facsimile system that does not have a one-to-one synchronous relationship between synchronized mechanisms in the system. In operation, a print carriage is synchronized to a false once-around signal related to the motion of a print drum. There is a predetermined cyclic relationship between the false once-around and the real once-around for the drum. If a mid-page interrupt occurs, the line position at the time of interrupt is remembered, and the particular relationship existing between the false once-around and the real once-around at the time of interrupt is remembered. The carriage is backed up to a point prior to the mid-page interrupt and rests until restart. Upon restart, the carriage is accelerated up to speed and resynchronized to the false once-around before it reaches the point of interrupt. The once-around to which the carriage is resynchronized has the same relationship to the real once-around as stored at the time of interrupt. When the carriage reaches the interrupt point, that position is detected, and the facsimile system resumes printing on the next line without splitting or overlapping the image.

23 Claims, 12 Drawing Figures

FACSIMILE MID-PAGE RESTART

DESCRIPTION

1. Field of the Invention

This invention relates to resynchronizing a scan mechanism or a print mechanism in a facsimile machine when the operation is interrupted during the middle of a page. More particularly, the invention relates to resynchronizing the mechanisms in speed and position relative to the line reference pulses so that the operation may restart without an overlap or a gap in the scanned or printed image.

2. Background Art

In facsimile operations, a regular occurrence is an interrupt during the scanning or printing of the page being copied. This interrupt may be due to a temporary mechanical, electrical or data transmission problem. Also if data compression is being used, it is possible that the scanner will overrun the printer or the printer will outrun the scanner and force an interrupt of one of their operations. If an interrupt does occur, the scan image or print image will be degraded in quality unless the scan or print operation can be restarted without an overlap or gap in the scanning and printing operations.

This problem is compounded in a multiple print-size facsimile machine. Such a machine has various selectable speeds for the carriage carrying the scan or print head and the drum carrying the medium being scanned or printed. By having selectable speeds, the print image may be changed in size relative to the scan image. However the variable speeds for the mechanisms mean that there is no one-to-one correspondence between drive signals for the carriage drive and the drum drive to position synchronize the mechanisms at all speeds. Such a relationship is desirable in order to resynchronize the mechanisms in the middle of a page on restart after an interrupt.

One solution to this problem is to avoid mid-page restart by throwing away a partial image and restarting at the top of the scan or print page. This can be costly in wasted material or wasted time depending on the facsimile system being used. Also this solution will not work if the facsimile system has a high speed printer capable of outrunning the data transmission rate.

Another way to avoid the problem at the printer is to electronically store the image of an entire page before starting a print operation. This eliminates interrupts caused by the scanner or the transmission apparatus, but it can be prohibitively expensive because of the very large memory required.

Synchronizing the scanning operation and printing operations in a facsimile system is well known. One example is shown in U.S. Pat. No. 3,553,370 entitled "Phasing System for Facsimile Transmitter and Receiver Utilizing Pulse Generating and Counting Devices." This patent is directed to synchronizing a rotary scanner and a rotary printer in a facsimile system so that the two devices are locked in phase. In this patent there is a one-to-one relationship between the rotary members being synchronized. The patent does not teach synchronization in a multi-speed facsimile machine where there is no one-to-one relationship between the cyclic mechanisms. Further, the patent does not address the problem of how to return the scanner or printer to precisely the same speed and precisely the same position for restart if a facsimile operation is interrupted in the middle of a page.

One patent that does discuss automatically stopping and starting a facsimile system in U.S. Pat. No. 2,873,315 entitled "Automatic Start-Stop Circuit for Facsimile Recorders" and issued to R. E. Fricks on Feb. 10, 1959. Fricks teaches a circuit for automatically stopping a print drum if framing pulses are not received. When the framing pulses resume, the drum is resynchronized to the framing pulses. Fricks does not discuss gaps in the image caused by an interrupt. Presumably, interruption would create a gap as the mechanisim restarts. Furthermore, Fricks system is not a multiple-print size facsimile machine.

Recovery in the middle of a page is taught by F. R. de Vos et al in their U.S. Pat. No. 3,784,739 entitled "Apparatus for Engraving a Cylinder with Repeated Overlapping Patterns" and issued on Jan. 8, 1974. In this patent, when the engraving operation is interrupted, the engraving head is backed up to a point in advance of the interrupt position. During restart engraving starts on the same print line of the interrupt but in advance of the interrupt position. Therefore, there is a region of overlap on one print line where engraving occurs twice. This will degrade the engraved image unless the print data is identical. The patent acknowledges this problem but chooses to accept it to avoid gaps in the engraved image that would degrade the image even more. In addition, de Vos et al do not teach a multiple copy-size engraving machine and thus are not faced with the same problem as the present invention.

SUMMARY OF THE INVENTION

It is an object of this invention to restart a scanning or printing operation in the middle of a facsimile image without overlapping portions of the image or leaving gaps between portions of the image.

It is an object of this invention to resynchronize in velocity and position the scanning or printing mechanism of a multiple print-size facsimile system during a scan or print operation.

In accordance with this invention the above object has been accomplished by generating false, print/scan line reference pulses, which are a fraction of the cycle between real line reference pulses, and by synchronizing the scan/print carriage to the false line reference signals, storing the synchronization conditions at the time of the interrupt, backing the carriage up to allow time for resynchronization and resynchronizing the carriage to the same false line reference signal in accordance with the conditions stored at the time of the interrupt.

With our invention a scan or print operation for a facsimile image may be restarted in the middle of the image with no degrading of the image. Therefore, no time is lost in the facsimile operation other than that caused by the interrupt itself. Furthermore, no material is wasted which could be a significant savings in an engraving operation.

DETAILED DESCRIPTION

Figure 1:
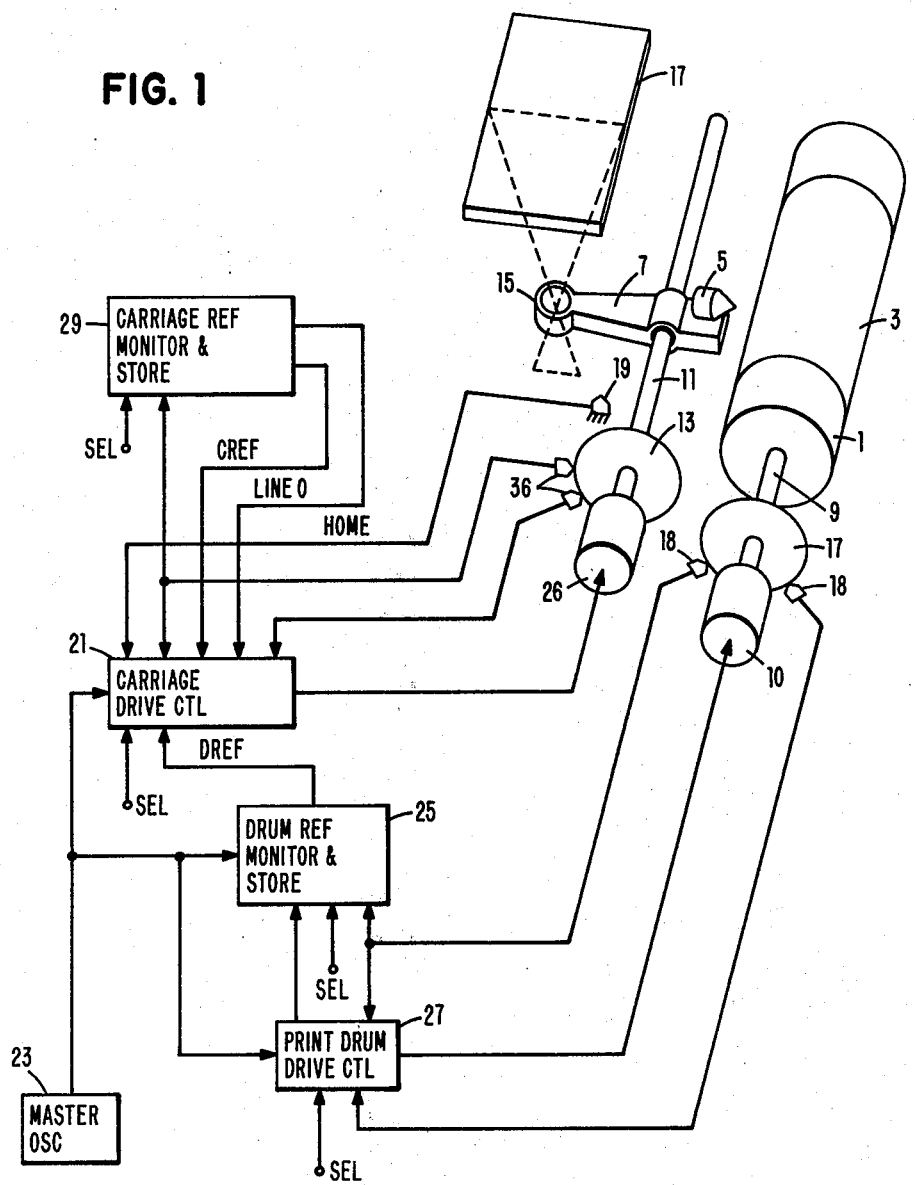
FIG. 1 is a schematic diagram of the invention with a print drum drive control with a drum reference monitor and store and a carriage drive control and with a carriage reference monitor and store.

Referring now to FIG. 1, print drum 1 carries a print sheet 3. As the drum rotates at high speed, an image is printed on sheet 3 by a marking apparatus 5 carried on carriage 7. The marking apparatus is preferably an ink jet print head. The print drum is driven by motor 10 driving shaft 9. Also mounted on shaft 9 is a grating disk 17 for a tachometer. The grating disk is monitored by two sensors 18. These two sensors are spaced relative to the disk so that a two phase output results. Tach signals with different phases are used so drum rotation direction as well as position and speed may be detected.

Similarly, carriage 7 is driven through a lead screw 11 which is rotated by carriage drive motor 26. Attached to the lead screw is a tachometer grating disk 13. Two sensors 36 are provided so that the direction of the lead screw may be monitored as well as position and speed.

Carriage 7 also carries a lens 15 for line scanning a document. The document is placed face down on a document glass 17. As carriage 7 is moved by the lead screw 11, the line scan moves down the length of the document. The line of light from the document would be typically focused onto a charge-coupled photo-diode array by the lens 15.

While the embodiment shows a cariage carrying both the print head and the scanner, two carriage drives could be used to drive the scanner and printer independently.

A home position sensor 19 provides a start position reference point for the motion of the carriage 7. Between scans across the page, carriage 7 is in a idle or rest position adjacent the tachometer disk 13. When the carriage begins to move, it crosses home sensor 19. Sensor 19 generates a a "home" position reference signal for the carriage drive control 21. Carriage drive control 21 drives the carriage motor 26 which rotates the lead screw 11. The control 21 controls the start, stop and forward/reverse drive of the carriage at the beginning and end of a page or during a hitch operation in the middle of a page.

Clock signals for controlling the speed of the carriage are derived from a master oscillator 23. A derived frequency signal, which controls the speed of the carriage, is gated by a select (SEL) signal applied to the carriage drive control 21. The carriage drive control also receives a drum reference (DREF) signal and a carriage reference (CREF) signal to coordinate the motion of the print drum with the carriage. The DREF signal is generated by the drum reference monitor and store 25. As will be discussed hereinafter, the monitor and store 25 monitors the master oscillator signal and derives the DREF signal from the selected frequency which corresponds to the speed of the print drum. The print drum speed is controlled by the print drum drive control 27. The drive control also receives the master clock signal from a master oscillator 23 and in accordance with the speed selected by the SEL signal, drives the print drum motor 10.

The CREF signal is generated by the carriage reference monitor and store 29. The carriage reference monitor and store monitors the signal from the tach sensors 36 to derive a carriage reference (CREF) signal. The CREF signal corresponds to a reference position equivalent to one print line of dots or pels across print sheet 3 or one scan line across the document on document glass 17. The rate at which these CREF signals are generated depends on the speed of the carriage which is selectable. Accordingly, the rate at which the carriage reference signals are derived from the tach sensor pulses is selected by a SEL signal.

In operation, the print drum is driven independently by the drive control 27. The carriage drive control 21 controls the carriage in a manner such that the carriage motion is coordinated with the print drum. The carriage reference monitor and store 29 tracks the position of the carriage and provides recovery reference signals in the event a print operation is interrupted. Monitor and store 29 remembers the carriage position at the time of the interrupt and provides recovery reference information to the carriage drive control 21 upon restart after the interrupt. This allows the carriage to move the print head 5 to the exact line position or CREF at which printing was interrupted. The drum reference monitor and store 25 tracks the drum reference positions so that in an interrupt situation, the drum position at the DREF signal occurring at the time of an interrupt may be stored and used by the carriage drive control 21 during restart. In this way the same DREF signal to which the CREF signal was coordinated at the time of interrupt will be the reference at restart.

Figure 2:
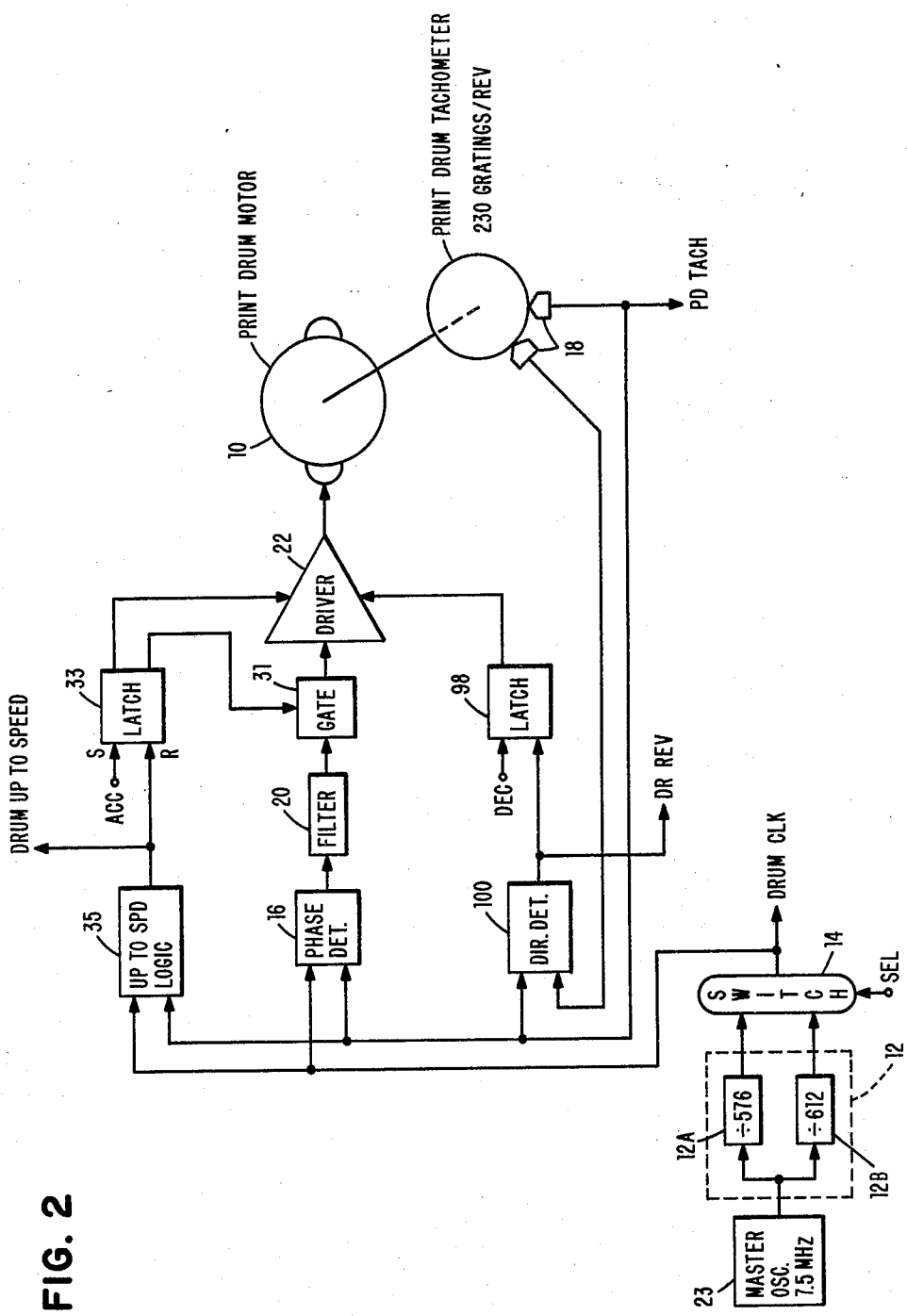
FIG. 2 shows the details of the print drive control.

The operation of the drive controls and the monitor and store devices is better understood by reference to FIGS. 2, 3, 4A and 4B. In FIG. 2, the details of the print drum drive control 27 of FIG. 1 are shown. The print drum motor 10 drives the print drum during the printing operation. During printing the high speed motor 10 is synchronized to a selected frequency derived from master oscillator 23. The master oscillator operates at 7.5 megahertz. This frequency is divided down by frequency dividers 12 to one of a plurality of frequencies. The frequency to be used and, thus, the speed of the print drum is selected by switch 14. Divider 12A provides a Drum Clock signal at the frequency selected for normal or 1:1 horizontal print size. Divider 12B provides a Drum Clock signal for a 6% horizontal reduction in print size. The speed selection (Sel) signal for switch 14 may simply be a key signal from an operator or it could be generated as command from a microprocessor.

Locking the speed of the print drum motor 10 to the selected frequency is achieved by phase detector 16. Phase detector 16 receives tachometer pulses from one of the tach sensors 18. The pulse frequency indicates the rotational speed of the motor 10. When the print drum motor is up to speed, the phase of these tachometer pulses is compared with the phase of the Drum Clock signal received through switch 14. Any out of phase condition is converted to a DC level by the filter 20. The filter also provides some stability to the servo loop. The output of the filter 20 is applied to the drive 22 through the gate 31 to drive the DC motor 10 to reduce the phase error.

Initially, when the motor 10 is being brought up to speed, the motor is driven open loop. There is no feedback from the tachometer through the phase detector to control the motor 10 because gate 31 is not enabled by the reset side of latch 33. Drum motor 10 is started up by an accelerate command from a microprocessor. This command sets latch 33 and latch 33 causes driver 22 to accelerate the motor 10. During acceleration, the up to speed logic 35 monitors the Drum Clock signal and the tach pulses. During each cycle of Drum Clock frequency the trailing edge of a tach pulse is compared to the trailing edge of the clock pulse. As soon as the trailing edge of a tach pulse occurs prior to the trailing edge of a clock pulse, the motor 10 is at the selected speed. Up to speed logic 35 then resets latch 33. Thereafter, gate 31 is enabled so that phase detector 16 controls the drive signal supplied to driver 22 as described above. Motor 10 is then driven closed loop and continues to run at the selected speed.

Figure 3:
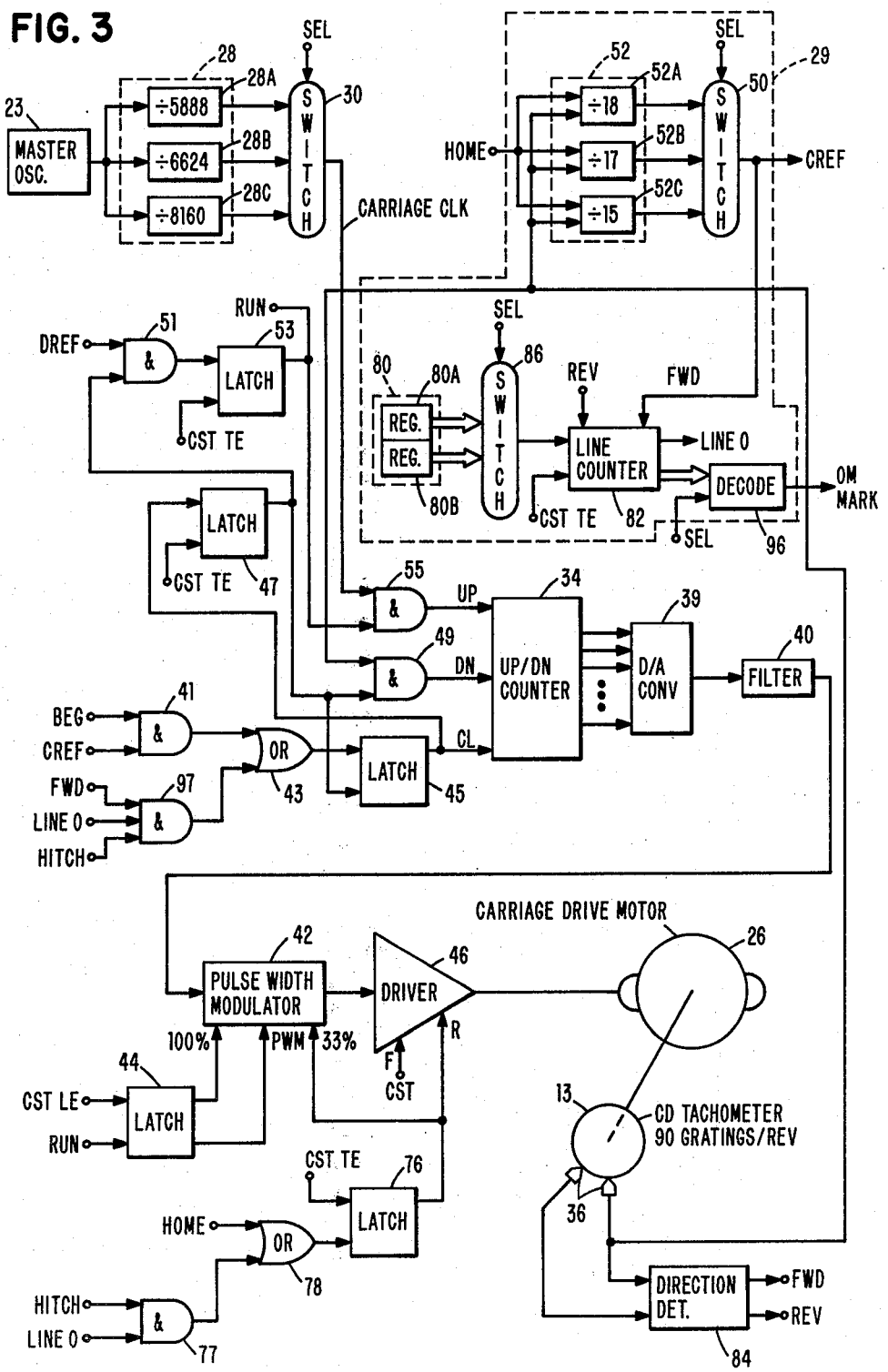
FIG. 3 shows the details of the carriage drive control and the carriage reference monitor and store.

Similarly, the carriage drive motor 26 in FIG. 3 is locked to a selected frequency divided down from the 7.5 mHz master oscillator 23. The frequency dividers 28 provide multiple speed choices for the carriage drive motor. Divider 28A provides a Carriage Clock signal to control the speed during a normal or 1:1 ratio in vertical print size. Divider 28B provides a Carriage Clock signal for the carriage speed to produce a 6% vertical reduction in print size. Divider 28C provides a Carriage Clock signal for the carriage speed to produce a 23% vertical reduction in print size. speed is selected by a clock selection (Sel) signal applied to switch 30. The Sel signal may be key operated or generated by a microprocessor.

The pulses of the Carriage Clock signal are passed to counter 34 to cause the counter to count up. The frequency of tach pulses from tachometer 13 give a measure of the rotational velocity of the motor 26. These tach pulses are passed to the counter 34 to cause the counter to count down. When the carriage drive motor is at its desired speed, the count in counter 34 will be a measure of the energy required to keep the motor at the desired speed. This count is converted to a DC level by a digital-to-analog convertor 39 and filter 40. The DC level is used to control the amount of modulation by a pulse width modulator 42. The pulse width modulated signal is passed to driver 46. Driver 46 then drives the carriage drive motor 26 in accordance with the percentage of modulation of the pulse width modulated signal.

Initially, to bring carriage drive motor 26 up to speed, the motor is driven open loop. The start up of the motor is controlled by a Carriage Start (CST) signal applied to driver 46. The CST signal is shown in the timing diagram of FIG. 5. While the CST signal is high, the driver 46 will drive motor 26 in the forward direction if it receives a drive signal from the pulse width modulator (PWM) 42. During start up or acceleration of the carriage drive motor, PWM 42 generates a full pulse or 100% duty cycle pulse for driver 46. A set condition on latch 44 causes modulator 42 to generate the 100% pulse. Latch 44 is set by the leading edge of the CST signal (CST LE).

Carriage reference monitor and store 29 of FIG. 1 is also shown in detail in FIG. 3 and is designated by the blocks within dashed lines in FIG. 3. The CREF or carriage reference pulse is generated by frequency dividing the tachometer pulses from tach 13. The occurrence of CREF indicates the lead screw 11 (FIG. 1) has rotated enough to move the carriage one line position. Since the lead screw can move at various rotational speeds, switch 50 selects the appropriate frequency divider 52. Divider 52A is used to generate CREF pulses when the facsimile system is producing normal or 1:1 size prints. Divider 52B generates the CREF pulse when the facsimile system is producing prints reduced 6% in size. Divider 52C provides the CREF pulses when the prints are reduced 6% in the horizontal dimension and 23% in the vertical dimension.

The Sel signal for switch 50 to select one of the dividers is the same key operated (or microprocessor generated) signal that controls switch 30 to select one of the dividers 28. The selected divider 52 counting pulses from tachometer 13 and the selected divider 28 counting master clock pulses for carriage speed control define the line spacing on the print sheet 3 (FIG. 1).

The frequency dividers 52 are counters which are initialized to zero and enabled by the HOME pulse (FIG. 5) when the carriage crosses the home position which is sensed by sensor 19 (FIG. 1). Accordingly, the first CREF signal will occur a predetermined distance from the home position. Thus, CREF represents precise position information for the carriage as it is moved by carriage drive motor 26.

During start up of the carriage, motor 26 is driven open-loop since latch 44 holds pulse width modulator 42 in a state of always generating 100% duty cycle pulses. The transition to closed loop operation of the motor 26 using counter 34 starts with AND 41. AND 41 is enabled by a BEGIN signal that goes high with the CST signal at the beginning of a page (see FIG. 5). With AND 41 enabled the first CREF pulse, after the home position is sensed, is passed by AND 41 and OR 43 to set clear latch 45.

The set condition of clear latch 45 clears counter 34 to zero and sets down latch 47. Down latch 47 then enables AND 49 and resets the clear latch 45. AND 49 when enabled passes tach pulses from tach 13 to the count down input of counter 34. The set condition of down latch 47 also enables AND 51.

Figure 5:
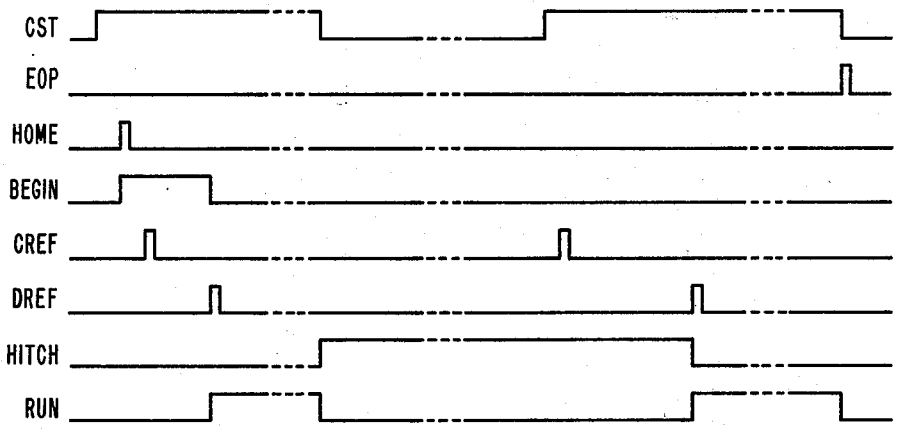
FIG. 5 is a timing diagram of control signals used in FIGS. 1, 2, 3 and 4.

With AND 51 enabled, the next DREF pulse is passed to set the up latch 53. A set condition of the up latch 53 corresponds to the RUN signal (FIG. 5). In effect while latch 53 is set, the carriage drive motor is being driven closed loop. The set condition enables AND 55 and resets latch 44. With AND 55 enabled the Carriage Clock pulses, which are the speed reference, from switch 30 are passed to the count up input of the counter 34. With latch 44 reset, pulse width modulator 42 will operate in the normal pulse width modulation mode.

As discussed previously the count in counter 34 controls the amount of modulation produced by pulse width modulator 42 to control the speed of the carriage drive motor 26. When the loop settles out, the count in counter 34 will be that necessary to overcome drag in the carriage drive to maintain the speed of the carriage.

Since the counter 34 begins to count down at the first CREF pulse and begins to count up at the first DREF pulse, the linear motion of the carriage and the rotational motion of the print drum will be locked into a relative position. When the carriage drive loop settles out, the CREF and DREF pulses will occur simultaneously. In effect an offset count measuring the phase difference between CREF and DREF has been loaded into counter 34 and worked off by the closed loop operation of the carriage motor drive. However, the DREF and the real once-around (ROA) reference pulses for the drum are not at the same frequency. It is not necessary for DREF and ROA to coincide as this allows more flexibility in the design of the phase locked loops that control the drum and carriage. In effect the carriage and drum are locked to the same master oscillator and the carriage is referenced in phase to a false once-around signal, DREF. The real once-around, ROA, will be used to start each print line while synchronization of the carriage to the drum is maintained with the false or fake once-around DREF.

Figure 4A:
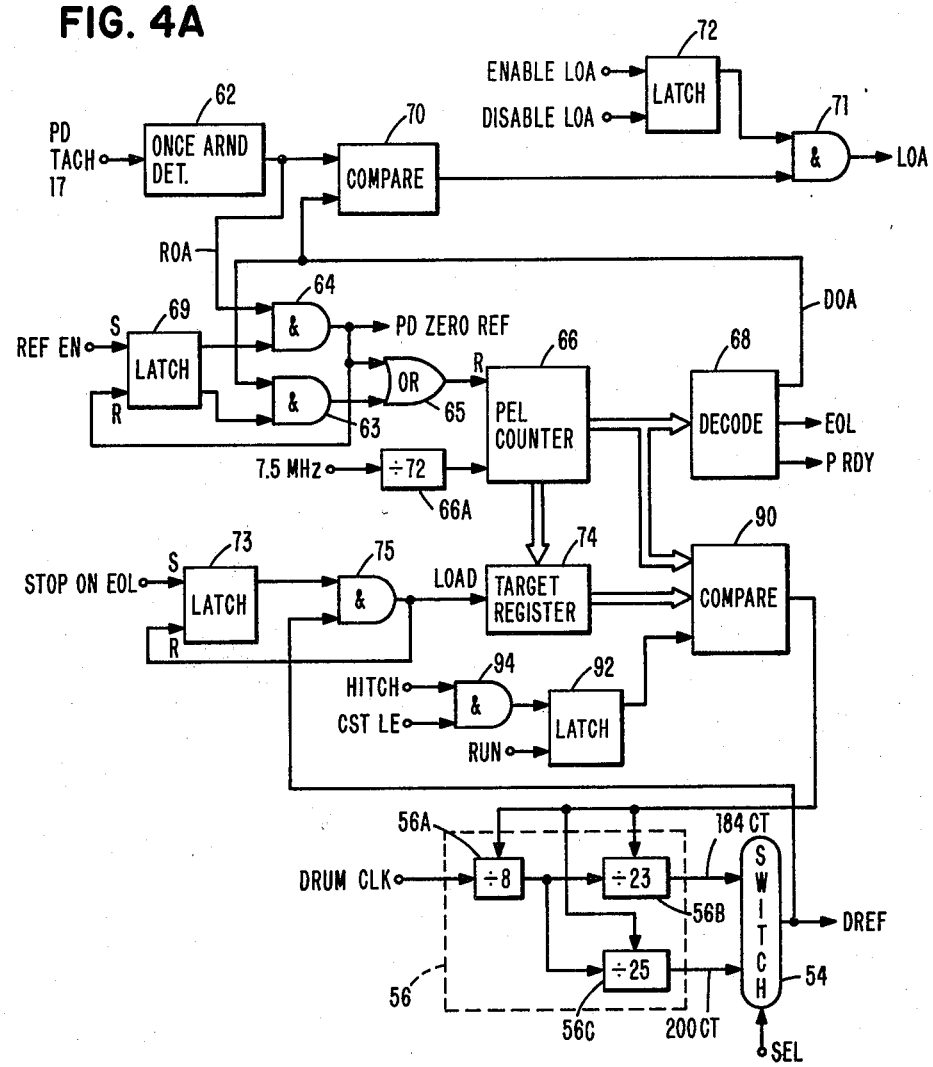
FIG. 4A shows the details of the drum reference monitor and store.

Referring now to FIG. 4A, a Drum Reference (DREF) pulse is generated directly from the 7.5 mHz master oscillator 23 through selected frequency dividers 56. The real once-around ROA occurs once for every 230 counts or pulses of the Drum Clock (but is not generated from the Drum Clock). This is because the grating on the print drum tach (FIG. 1) has 230 gratings per revolution. Dividers 56 generate fake once-around pulses every 184 counts or every 200 counts of the Drum Clock signal. Dividers 56A and 56B together generate the 184 count DREF's, and dividers 56A and 56C together generate the 200 count DREF's. The 184 count DREF is used during normal and 6% reduction printing; the 200 count DREF is used during the printing of the 23% vertical and 6% horizontal reduced image.

Switch 54 selects one of the frequency dividers 56 to provide the DREF pulse. The selection (Sel) signal to control switch 54 is a key operated signal or may be microprocessor generated. Because the print drum motor 10 is locked to the Drum Clock and the DREF signal is generated from the Drum Clock, the DREF signal serves as a reference position for synchronizing the carriage to the drum even though DREF is not generated from the drum tach.

Figure 4B:
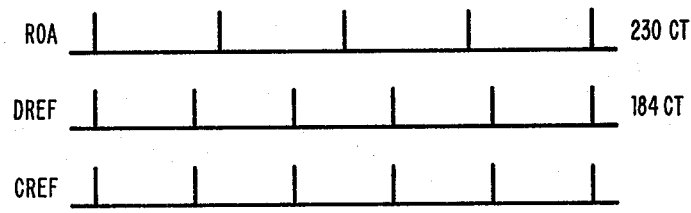
FIG. 4B is a timing diagram showing the relationship between a carriage reference signal, a false line-reference signal (DREF) and a real line-reference signal (ROA).

The relationship between the real once-around and the fake once-around is shown in FIG. 4B for the 184 count DREF. This DREF has a 4:5 ratio relative to the real once around ROA which is equivalent to a 230 count. Thus for every four revolutions of the print drum there will be five DREF pulses generated in this example. As FIG. 4B shows, once the carriage drive loop locks in the DREF pulses, the CREF and DREF pulses will occur at the same time.

To generate the real once-around pulses, print drum tachometer 17 does not have a special mark indicating the side edge of the print sheet 3 (FIG. 1). This mark serves as the real once-around mark as the drum rotates. The once-around mark is detected by once-around detector 62. When the detector 62 detects the once-around, it passes a pulse through AND 64 and OR 65 to reset the pel counter 66 to zero. Pel counter 66 is counting the picture elements or ink drop positions across a line on the printed page. The pel (picture elements) clock signal is derived from the master oscillator 23 through divider 66A. Accordingly the counter is in sync with the drum since oscillator 23 also controls the print drum motor drive. Further the pel counter 66 has a fixed phase relationship to the tachometer 17 since it is initialized by the real once-around when the drum motor is started up.

The count in counter 66 is monitored by decode 68. The decoder looks for a count indicating the start of the line and at that time generates a print ready signal which is sent to the microprocessor. The microprocessor can then start the print operation for the line. Decoder also looks for a count in the pel counter 66 that indicates the end of the print line (EOL). Finally, decoder 68 monitors the count in the counter 66 to generate a once-around signal. This once-around signal is passed back to the gate 63 and used to reset the counter 66 for a new line.

Pel counter 66 is reset to start counting pels in a new line by a real once-around pulse from the print drum tach or by a decoded once-around pulse from counter 66. Whether a real once-around pulse or a decoded once-around pulse is used depends upon the state of latch 69. Latch 69 is set by a Reference Enable command from the supervisory microprocessor when the print drum is started up. With latch 69 set, the first real once-around pulse through AND 64 will reset the pel counter to zero and reset latch 69. With latch 69 reset, AND 63 is enabled and counter 66 is reset thereafter by decoded once-around pulses. The reference enable command is not issued by the microprocessor until the print drum has settled at its operating speed. Therefore, the real once-around pulses and the decoded once-around pulses should be occurring at substantially the same time.

To check that the real once-around and the decoded once around pulses are within a small tolerance interval of each other, compare 70 is used. Compare 70 has an output if these two pulses are more that a few milliseconds apart. An output from compare 70 represents a Lost Once Around (LOA) condition. If AND 71 is enabled the LOA signal is passed back to the microprocessor so that the microprocessor can abort the printing operation. AND 71 is enabled by latch 72 if the latch is set by an Enable LOA command from the microprocessor. Latch 72 is reset by a Disable LOA command from the microprocessor. In this way, the supervisory microprocessor controls when it wishes to monitor the print drum motion for the Lost Once Around condition.

At the start of the page, the CREF signal is synchronized to the first DREF occurring after the CREF. The phase of that DREF pulse relative to the real once-around is not known. At the beginning of the page this is of no consequence as it only shifts the starting point of the print image at the top of the page by one to four print lines or one to 20 print lines depending on the DREF count used, and each print line is only a few millimeters wide. However, in the event the print operation must be interrupted during the printing of a page, the CREF must be resynchronized at restart to the same DREF with which it was originally synchronized. Otherwise, a gap will appear in the printed image. This is accomplished by using the target register 74.

When the CST signal drops (goes low) in the middle of a page indicating an interruption of the printing, the next DREF signal occurring after the trailing edge of the CST signal is detected by latch 73 and AND 75. This DREF is used to load the pel count from counter 66 into target register 74 and to reset latch 73 which was set by Stop on EOL signal from the supervisory microprocessor. The target register 74 then contains a count which is equivalent to the angular position of the drum at which the first DREF occurred after interrupt of the printing operation. During restart the CREF must be resynchronized to this DREF or a gap will occur in the printed image.

Referring now to FIGS. 3 and 4 together, the trailing edge of CST (CST TE) also sets latch 76. Latch 76 in a set condition switches driver 46 to reverse the drive to carriage drive motor 26. Latch 76 also switches pulse width modulator 42 to produce 33% pulses. In effect a one/third reverse drive is applied to carriage motor 26 causing it to slow down and reverse the motion of the carriage.

The CST trailing edge signal is also used to load a count from registers 80 into the line counter 82. Line counter 82 tracks the position of the carriage by counting CREF pulses as the carriage moves. If the carriage is moving forward the counter is counted up, and if the carriage is moving in reverse the counter is counted down. The forward and reverse motion signals for the carriage are generated by the direction detector 84 which monitors the CD tachometer. The tachometer is a two phase tach with two sensors 36 so that direction of rotation can be detected.

The count loaded into line counter 82 is a measure of the distance that the carriage must move backwards to be at a position called Line 0. Line 0 is not the top of the page; it is simply a measured line count distance back from the point of interrupt. This distance is sufficient to allow the carriage to be accelerated up to speed and to allow resynchronization of the CREF pulse to the stored DREF pulse. The distance is different for different speeds of the carriage and drum. Therefore, the count loaded into counter 82 is selectable by switch 86. Register 80A contains a count of twenty five for the mode where there is a 1:1 print size or for a 6% reduced print size. Register 80B contains a count of twenty three for the mode where the print size is reduced 23% in the vertical dimension. In either case the print drum will complete twenty revolutions while line counter 82 is counting 25 or 23 CREF's respectively.

In response to an Sel signal, switch 86 passes the appropriate predetermined count for the mode from one of the registers 80 to the counter 82. The Sel signal may be key operated or generated by the microprocessor; it would be set at the same time as Sel signals for switches 14 (FIG. 2), 30, 50 and 54.

Figure 8:
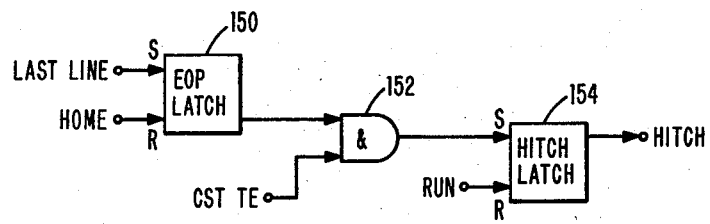

As the carriage reverses and moves backward, the line count in counter 82 goes to zero. When the count in the line counter 82 reaches zero, the Line 0 signal from counter 82 is passed by AND 77 and OR 78 to reset latch 76. AND 77 is enabled by the HITCH control signal (FIGS. 5 and 8). With CST down and latch 76 reset, driver 46 turns off, and the carriage coasts to a halt. As the carriage coasts, line counter 82 continues to count CREF pulses in order to track the carriage position. The carriage is then in a position such that it may be accelerated and resynchronized prior to reaching the position where printing stopped.

To restart the printing operation, the carriage drive motor 26 is driven open loop by 100% duty cycle pulses as described before when the carriage was started at the top of the page. The CREF signals need not be reset because line counter 82 has been tracking the position of the carriage. However, DREF must be started up to be the same DREF as that which occurred at interrupt. This is accomplished by compare 90 comparing the contents of pel counter 66 with the stored DREF position count in target register 74. When compare 90 gets an equal match condition, the print drum is in exactly the same DREF position it was in when printing stopped. The output from comparator 90 resets the frequency dividers 56 to zero and, thus, forces the generation of the DREF signal. The CREF and DREF signals are then synchronized as before by loading an offset count into counter 34 and closing the loop on the carriage drive motor 26 so that the carriage servo loop can work off the phase difference between CREF and DREF.

Figure 7:
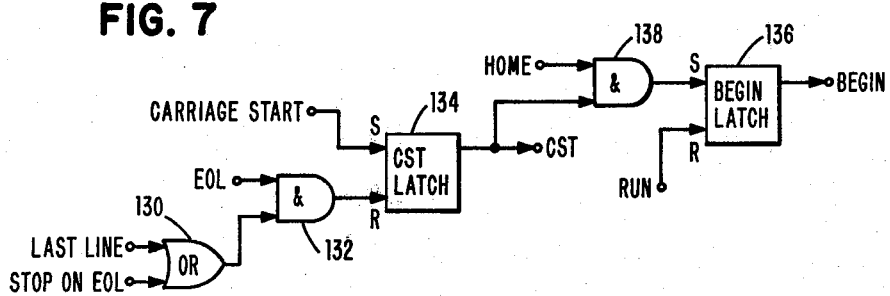
FIGS. 7 and 8 are diagrams of logic used to generate control signals for FIGS. 1, 2, 3 and 4.

Compare 90 is enabled by latch 92 so that it is only looking for a match during a HITCH (restart) operation. The HITCH signal (FIG. 5) enables AND 94 to pass the leading edge signal of CST. CST comes up under microprocessor control when print data is again available (FIGS. 5 and 7). Latch 92 is reset by the RUN signal after the DREF pulse has set the RUN latch 53.

The carriage drive is restarted when the CST signal again goes high. Driver 46 (FIG. 3) is switched to forward drive by CST. Latch 44 is set by CST leading edge which causes the modulator 42 to pass 100% pulses to driver 46. As the carriage accelerates forward, line counter 82 is advanced by each CREF pulse. When Line 0 is crossed as indicated by counter 82, the Line 0 signal is passed by AND 97 and OR 43 to set Clear latch 45. (Line 0 is crossed during acceleration on restart because the carriage coasted past Line 0 when it stopped.) AND 97 is enabled by two conditions—forward (FWD) motion of the carriage as detected by direction detector 84 and the presence of the HITCH signal.

Latch 45 in a set condition clears the counter 34 and sets latch 47. Latch 47 resets the clear latch and enables AND 49 to pass carriage tach pulses to count counter 34 down or negative. Latch 47 also enables AND 51 to watch for the next DREF pulse. The DREF pulse will occur when compare 90 detects a match between the stored DREF position in register 74 and the pel count in counter 66. Compare 90 resets dividers 56 to zero which is the condition for a DREF signal from the dividers. The forced DREF pulse is passed by AND 51 to set latch 53 which enables AND 55. AND 55 then passes Carriage Clock pulses indicative of the desired speed for the carriage to the count up input of counter 34.

Latch 53 is the RUN latch and its RUN signal indicates the carriage drive servo loop is now closed. The RUN signal is passed back to reset latch 44 and latch 92. Latch 44 when reset switches the pulse width modulator 42 to normal operation thus closing the servo loop. Latch 92 when reset stops compare 90 from looking for further matches between the pel count and the stored DREF position.

With the servo loop closed, the phase difference between CREF and DREF is worked off as the carriage settles at the desired speed. By the time the carriage reaches the the same line position it was in when the interrupt occurred, CREF is locked to same DREF it was synchronized to at the time of interrupt.

Detecting that the carriage has returned to the same line position, that it had at the time of interrupt, is accomplished by detecting the same count twenty three or twenty five as that loaded into the line counter 82 from registers 80 when CST dropped (CST TE). Decoder 96 monitors the line counter to detect one of these counts. The same select signal Sel that controlled switch 86 may be used to select the count to be decoded by decoder 96. When the count is detected, decoder 96 generates an On Mark signal for the print controls (not shown). From the On Mark signal (FIG. 3), the print controls know that the print head is passing over (without printing) the last line printed before interrupt. At the next end of line EOL signal, the system is in the same state it was before interrupt, and at the following Print Ready (P RDY) from decode 68 (FIG. 4A), it starts the printing of the next line.

The system continues in the normal fashion to print the rest of the page. At the end of the page, the microprocessor generates the Decelerate command that sets latch 98 in FIG. 2. The set condition of latch 98 reverses the drive to driver 22 to brake the print drum 10. When direction detector 100 detects reversal of motion of the drum from the two phase drum tach, latch 98 is reset. Then there is no drive signal to driver 22 and the drum stops.

The microprocessing system (FIG. 6) used as a supervisor for the apparatus of the invention generates the following commands used by the invention: Drum Accelerate, Reference Enable, Enable LOA, Carriage Start, Last Line, Stop On EOL, Disable LOA and Drum Decelerate. The use of some of these commands has already been described. Drum Accelerate and Drum Decelerate set the accelerate latch 33 and the decelerate latch 98 in FIG. 2. Enable LOA and Disable LOA set and reset latch 72 FIG. 4A to control when the supervisor monitors for the LOA signal. Reference Enable sets latch 69 in FIG. 4A to initialize the pel counter 66 with a real once-around. Carriage Start, Last Line and Stop On EOL are commands used in FIG. 7 to control logic to generate the CST signal.

The Carriage Start signal sets CST latch 134 in FIG. 7. When latch 134 is set, the CST signal (FIG. 5) is high. CST latch 134 is reset by the EOL pulse from decode 68 (FIG. 4A) if AND 132 is enabled by the Last Line signal or the Stop on EOL signal passed by OR 130. The BEGIN signal (FIG. 5) is provided by BEGIN latch 136 when it is set. Latch 136 is set by the HOME pulse, if the CST signal is high, and is reset by the RUN signal from latch 53 in FIG. 3.

The logic in FIG. 8 generates the HITCH signal (FIG. 5). HITCH latch 154 is set by the trailing edge of the CST signal if there is no End of Page (EOP) condition. When latch 154 is set the HITCH signal is high. The EOP latch 150 enables AND 152 when it is reset. Latch 150 is reset by the HOME pulse and is not set until the Last Line signal is received from the supervisory microprocessor. Accordingly AND 152 is enabled during the printing of a page. If the CST TE occurs during the page printing, the HITCH latch 154 will be set.

Figure 6:
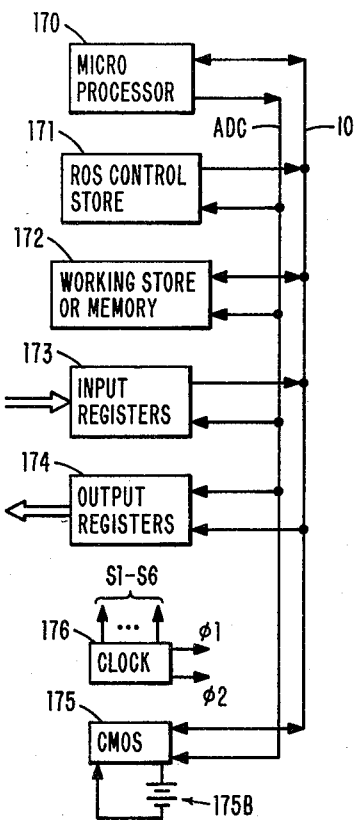
FIG. 6 is a block digram of the micro-processor system used to supervise the apparatus of the invention.

The supervisory microprocessor system is shown in FIG. 6. Microprocessor (MP) 170 operates based upon a set of control programs contained in ROS control store 171 and uses working store or memory 172 as a main or working store. MP 170 communicates with the other units of the Mid-Page Restart apparatus of FIG. 1 via the input registers 173 and the output registers 174. In a preferred constructed embodiment IO bus is eight bits wide (one character) plus parity. Address signals, selecting which units are to send or to receive signals with respect to MP 170, as well as other units, are provided by MP 170 over a sixteen bit ADC. A nonvolatile store CMOS 175 is a battery powered semiconductor memory using CMOS construction and powered by battery 175B. Clock 176 supplies timing signals to units 170–175.

The details of the MP 170 and the manner in which it may be programmed are described in commonly-assigned U.S. Pat. No. 4,170,414 entitled Document Feed Controls For Copy Production Machines. The same control microprocessing system described therein has been programmed to perform the supervisory functions for the present inventive system. Accordingly, shown and described herein is a flowchart for the supervisory routines with emphasis on the generation of the commands used by the Mid-Page Restart apparatus. The program code for generation of the commands is at the end of this description in Appendix B. To assist in understanding the exemplary program in Appendix B, a glossary of program instructions with their definitions is listed in Appendix A in alphabetic order by assembler type mnemonic.

Figure 9:
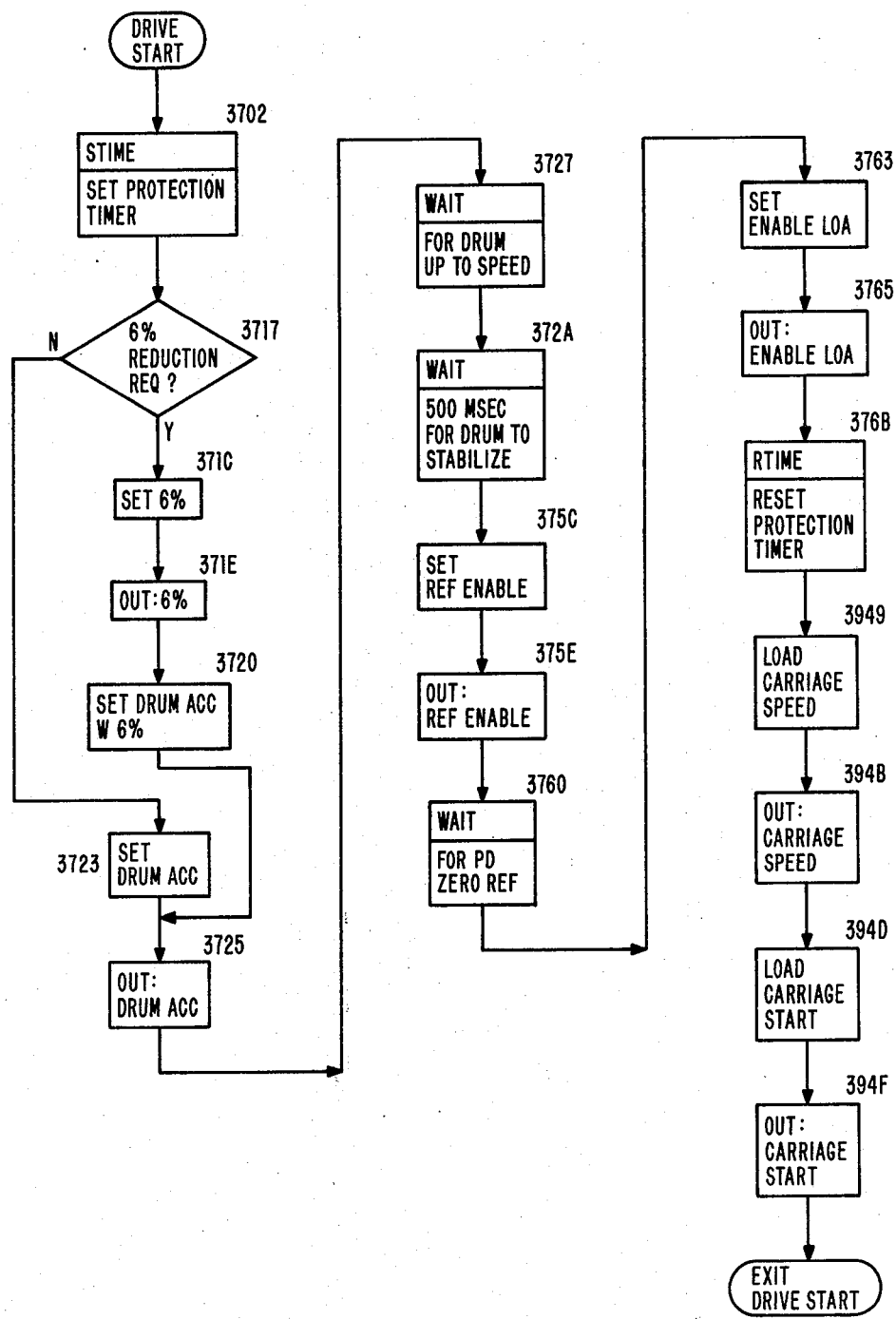
FIG. 9 is a flow chart of the supervisory program used by the microprocessor of FIG. 6 to supervise the start up of the carriage drive and the print drum drive.

The programming routine flowcharted in FIG. 9 generates the commands used to start the carriage drive motor and the print drum motor. The steps of the program flow are labeled with numbers corresponding to the memory location numbers for that program instruction in Table I in Appendix B.

The Drive Start routine begins by setting a protection timer. A macro routine stored at memory location 3702 is used for this function. The protection time sets a time-out period for bringing the print drum up to speed and checking its proper operation. After the protection timer is set, the microprocessor queries to see whether a six percent reduction in the horizontal dimension has been set by the key operator. If it has, programming step 371C sets a six percent bit in a control byte and step 371E outputs that control byte to energize the various select signals previously described for the six percent horizontal reduction mode. At step 3720, the drum acceleration with six percent reduction control bytes is set. The program jumps to step 3725 and outputs the Drum Accelerate command used to set latch 33 (FIG. 2).

If six percent reduction has not been requested, the program flow branches from step 3717 to step 3723 and sets the Drum Accelerate command. Immediately thereafter, the Drum Accelerate command is outputted by step 3725 again to latch 33.

With the drum accelerating, the program routine enters Wait macro 3727. This Wait macro waits for an interrupt signal indicating that the drum is up to speed. The drum up to speed indication is provided by the up-to-speed logic 35 (FIG. 2). After the up to speed signal is received, another Wait macro 372A is used to insert a 500 millisecond wait. This timed wait period is for the purpose of allowing the print drum to settle at its selected speed. After the 500 millisecond wait, step 375C sets a Reference Enable control byte and step 375E outputs this Reference Enable control signal. The control signal is passed by the output registers 174 (FIG. 6) to the input of Reference Enable latch 69 (FIG. 4A).

The start routine then enters Wait macro 3760 and waits for the print drum zero reference signal passed from AND 64 in FIG. 4A.

After the print drum zero reference signal is received back via the input registers 173 (FIG. 6), the start routine sets an Enable LOA control byte. Immediately thereafter at program step 3765, the Enable LOA control signal is outputted via registers 174. The Enable LOA signal sets latch 72 in FIG. 4A.

If all of the above steps in the start routine have been accomplished within six seconds, the RTIME macro at step 376B resets the protection timer. Otherwise, the protection timer will time out and the operation will be aborted or a recovery effort will be made. After the protection timer has been reset, the start routine proceeds to initialize the carriage drive.

At step 3949, the carriage speed previously selected by the operator is loaded into a control byte at a register. At step 394B, this control byte is outputted from the registers 174 to generate the select signal used at various switches shown in FIGS. 2, 3, 4A and 4B that are selected for the various modes of operation: normal, six percent reduction or twenty-three percent reduction. Next, at step 394D a carriage start control word is loaded and at step 394F the carriage start control byte is outputted through registers 174 (FIG. 6) to set the CST latch 134 in FIG. 7. As previously described, when the CST latch is set, the CST signal comes up (FIG. 5) and the carriage begins to move.

Figure 10:
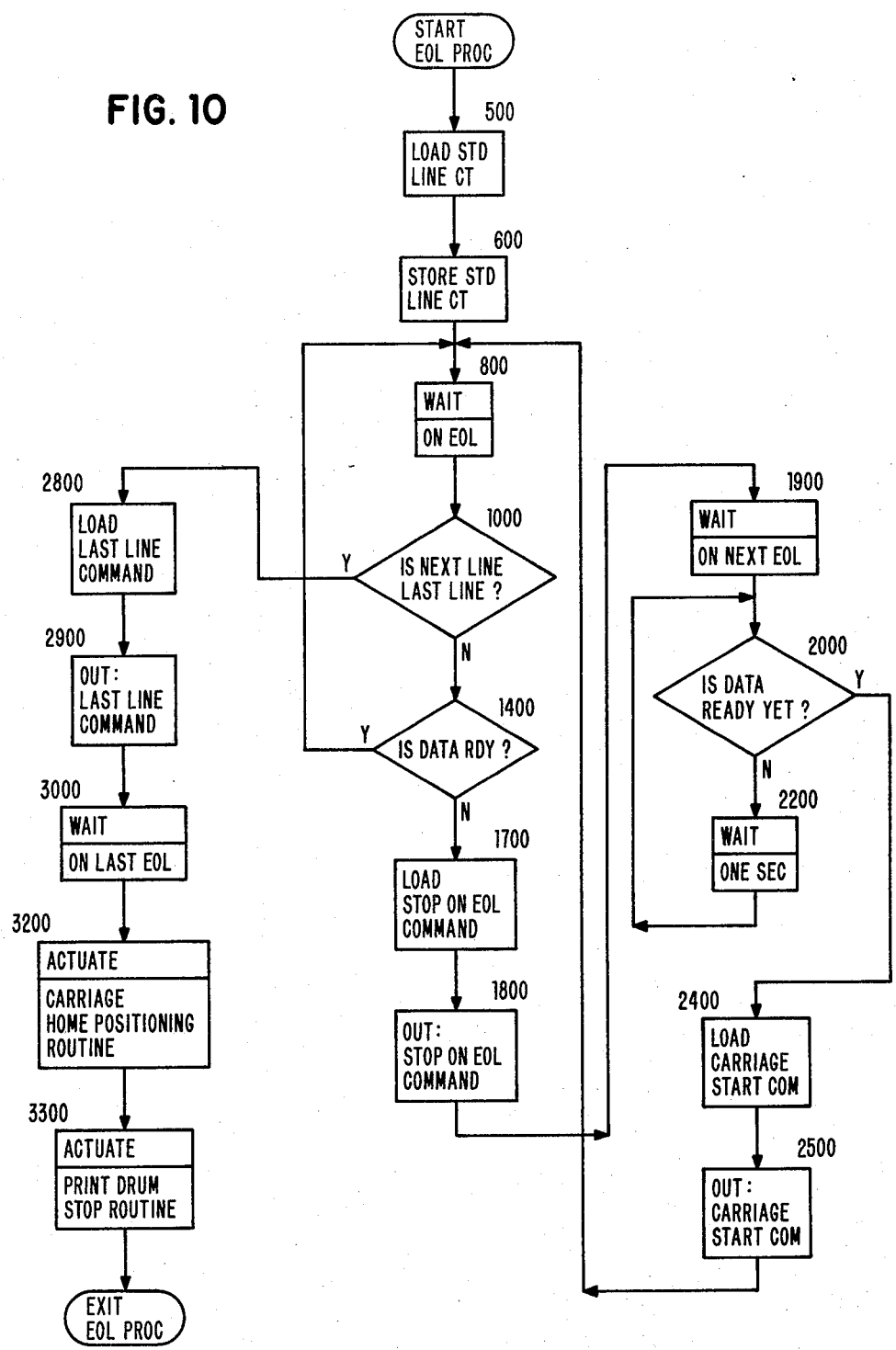
FIG. 10 is a flow chart of the supervisory program used by the microprocessor of FIG. 6 to supervise the the End Of Line process decisions for each print line.

In FIG. 10, the End of Line process is shown. Details of the program implementing this End of Line process are in Table II of Appendix B. The End of Line process monitors for the hitch operation or for End of Page conditions. It generates the stop on End of Line command and the Carriage Start command during a hitch operation. It also generates the last line command and actuates the Print Drum Stop routine at the end of the page.

In operation, the EOL process starts by loading a standard line count and storing the standard line count as represented by programming steps 500 and 600 in FIG. 10. The standard line count is the number of lines expected in the given scanning or printing operation. This count depends upon the mode of operation and will be different for the normal one-to-one operation, the six percent reduction operation or the twenty-three percent reduction operation.

After the line count is stored, the program enters the Wait macro 800. This macro looks for the End of Line signal from decode 68 (FIG. 4A). The End of Line signal is passed to the processor through the input registers 173 in FIG. 6.

Each time an End of Line signal is received, the End of Line process asks the question "Is the next line the Last Line?" If the response to this question is "yes", the program branches to function 2800 which loads the last line command in preparation for outputting. The next program step 2900 then outputs the last line command through the output registers 174 (FIG. 6) to OR 130 in FIG. 7 and to EOP latch 150 in FIG. 8.

After the processor notifies the mid-page Read/Start apparatus that it is now printing the last line, the processor waits for the last EOL signal. Macro 3000 is the Wait routine and waits for the EOL signal from decode 68 in FIG. 4A. When the EOL signal is received, the EOL process actuates the Carriage HOME Positioning routine 3200 and the Print Drum Stop routine 3300. The Carriage HOME Positioning routine (not shown) simply reverses the carriage drive motor and drives the carriage back to the home position where it stops and waits for the beginning of the next print operation. The Print Drum Stop routine is described hereinafter with reference to FIG. 11.

Returning to the decision block 1000 in FIG. 10, if the next line is not the last line, then decision block 1400 asks whether data is ready to print the line after next. If the data is ready, program control branches back to the Wait macro 800. Thus at the end of that line, the query will be asked as to whether the next line is again the last line. If the data is not ready for the line after next, then the program control branches from decision block 1400 to the load function 1700.

Starting at process step 1700, the processor loads a Stop on EOL command in preparation for outputting to the mid-page restart apparatus. This is the commencement of a hitch operation. In effect, the processor is saying the data for the next line after the one now being printed is not ready and, therefore, the carriage must be stopped at the next End of Line and begin a Restart operation. The program step 1800 outputs the Stop EOL command through registers 174 in FIG. 6 to OR 130 in FIG. 7. As a result, at the next EOL signal the CST signal will drop (see FIG. 7. After the outputting of the Stop on EOL command, the program enters the Wait macro 1900. This Wait macro looks for the next EOL signal. When the next EOL signal is received, the EOL process asks the question "Is data ready yet?" at the decision step 2000. If the data is still not ready, the program passes to the Wait macro 2200. This macro waits for one second and then interrupts to return program control to the decision block 2000 again. When the response to decision 2000 is positive, program flow branches to step 2400.

In step 2400, the Carriage Start command is loaded for outputting. At step 2500, the Carriage Start command is outputted through registers 174 to set the CST latch in FIG. 7. This commences the restart of the carriage drive as discussed previously. From step 2500, program control returns to the Wait macro 800 to wait for the next End of Line signal from decode 68 in FIG. 4A.

Figure 11:
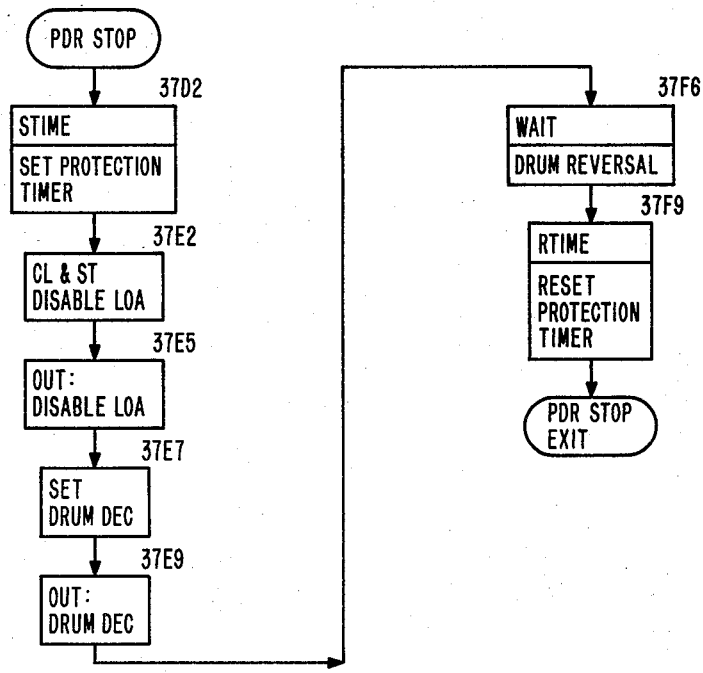
FIG. 11 is a flow chart of the supervisory program used by the microprocessor of FIG. 6 to supervise the shut down of the print drum drive.

In FIG. 11, the program flow for generation of the commands used in stopping the print drum are shown. The program instructions represented by the flowchart in FIG. 11 are listed in Table III in Appendix B. At the beginning of the Drum Stop routine, a STIME macro 37D2 sets a protection timer. This timer allows six seconds for the drum stop to be accomplished.

After the timer is set, the program at step 37E2 clears and stores a Disable LOA control byte. At program step 37E5, the Disable LOA command is outputted through register 174 (FIG. 6) to the reset side of latch 72 in FIG. 4A.

The program then sets a drum decelerate command at step 37E7. This decelerate command is outputted again through registers 174 in FIG. 6 to set latch 98 in FIG. 2. Thus far the Drum Stop routine has disabled the lost once-around check and initiated the deceleration of the print drum motor.

Next, WAIT routine starting at 37F6 waits for a drum reversal signal from direction detector 100 in FIG. 2. This drum reversal signal is passed to the microprocessor via the input registers 173 (FIG. 6).

The reset protection timer macro RTIME at 37F9 monitors to see that this stop drum sequence is completed within six seconds. If it is not accomplished within six seconds, the RTIME macro will initiate a recovery procedure. After the RTIME macro, the stop routine exits.

While the invention has been described as restarting a printer carriage relative to a print drum, it will be appreciated by one skilled in the art that an optical scanner could be on the carriage as shown in FIG. 1 and the once-around signal could be electronically derived from the linear scan operation. Furthermore, although we have illustrated and described the preferred embodiment of our invention, we do not limit ourselves to the precise construction herein disclosed and the right is reversed to all changes and modifications coming within the scope of the invention as defined in the appended claims.

APPENDIX A

| INSTRUCTION MNEMONIC | HEX VALUE | NAME | DESCRIPTION |
|---|---|---|---|
| AB | A4 | Add Byte | Adds addressed operand to ACC |
| AI | AC | Add Immed. | Adds address field to ACC |
| AR | DN | Add Reg. | Adds N-th register to ACC |
| A1 | 2E | Add One | Adds 1 to ACC |
| B | 24,28,2C | Branch | Branch to LSB (+256,−256,±0) |
| BAL | 30-33 | Branch And Link | Used to call subroutines |
| BE | 35,39,3D | Branch Equal | Branches if EQ set |
| BH | 36,3A,3E | Branch High | Branch if EQ and LO are reset |
| BNE | 34,38,3C | Branch Not Equal | Branch if EQ reset |
| BNL | 37,3B,3F | Branch Not Low | Branch if LO reset |
| BZ | 35,39,3D | Branch Zero | Branch if EQ set to zero |
| CB | AO | Compare Byte | Addressed byte compared to ACC |
| CI | A8 | Compare Immed. | Address field compared to ACC |
| CLA | 25 | Clear Acc. | ACC reset to all zeroes |
| GI | A9 | Group Immed. | Selects one of 16 register groups |
| IC | 2D | Input Carry | Generate carry into ALU |
| IN | 26 | Input | Read into ACC from addressed device |
| J | ON,1N | Jump | Jump forward or back using N-th register |
| JE | 4N,5N | Jump Equal | Jump if EQ set |
| JNE | 6N,7N | Jump Not Equal | Jump if EQ reset |
| LB | A6 | Load Byte | Load addressed byte into ACC |
| LDR | FN | Load/Decr.Reg. | Load reg. N and decrement (N=0-3,8-B) |
| LI | AE | Load Immed. | Load address field into ACC |
| LN | 98-9F | Load Indirect | Load byte addressed by reg. N into ACC |
| LR | EN | Load Register | Load register N into ACC |
| LRB | FN | Load Reg./Bump | Load reg. N and increment (N=4-7,C-F) |
| NB | A3 | And Byte | AND addressed byte into ACC |
| NI | AB | And Immed. | AND address field into ACC |
| OB | A7 | Or Byte | OR addressed byte into ACC |
| OI | AF | Or Immed. | OR address field into ACC |
| OUT | 27 | Output | Write ACC to addressed device |
| RTN | 20-23 | Return | Used to return to calling program (See BAL.) |
| SB | A2 | Subtract Byte | Subtract addressed byte from ACC |
| SHL | 2B | Shift Left | Shift ACC one bit left |
| SHR | 2F | Shift Right | Shift ACC one bit right |
| SI | AA | Subtract Immed. | Subtract address field from ACC |
| SR | CN | Subtract Reg. | Subtract reg. N from ACC |
| STB | A1 | Store Byte | Store ACC at address |
| STN | B8-BF | Store Indirect | Load ACC at address in reg. |
| STR | 8N | Store Reg. | Store reg. N at address |
| S1 | 2A | Subtract One | Subtract 1 from ACC |
| TP | 9N | Test/Preserve | Test N-th bit in ACC (N=0-7) |
| TR | BN | Test/Reset | Test and reset N-th bit in ACC |
| TRA | 29 | Transpose | Interchange high and low ACC bytes |
| XB | A5 | XOR Byte | Exclusive OR addressed byte into ACC |
| XI | AD | XOR Immed. | Exclusive OR address field into ACC |

Notes:
ACC (Accumulator) is 16-bit output register from arithmetic-logic unit
- all single byte operations are into low byte
- all byte and immediate operations are single byte operations
- register operations are 16-bit (two-byte)
EQ (equal) is a flag which is set:
if ACC = 0 after register AND or XOR operations; if ACC (low byte) = 0 after single byte operation; if a tested bit is 0; if bits set by OR were all 0's; if input carry = 0; if compare operands are equal; if bit shifted out of ACC = 0; if 8th bit of data during IN or OUT = 0.
LO (low) is a flag which is set: (always reset by IN, OUT, IC)
if ACC bit 16 = 1 after register operation; if ACC bit 8 = 1 after single byte operations; if logic operation produces all ones; if all bits other than tested bit =0; if ACC = 0 after shift operation; if compare operand is greater than ACC low byte.
MACRO

APPENDIX A

| MNEMONIC | NAME | DESCRIPTION |
|---|---|---|
| BC | Branch on Carry | Branches if carry is set |
| BL | Branch on Low | Branches if LO is set |
| BNC | Branch Not Carry | Branches if carry is reset |
| BNZ | Branch Not Zero | Branches if previous result was not zero |
| BR | Branch via Register | Same as RTN instruction |
| BU | Branch Unconditionally | Same as BAL instruction |
| CIL | Compare Immed. Low | Uses low byte of indicated constant in CI address field |
| DC | Define Constant | Reserves space for constant |
| JC | Jump on Carry | See BC |
| JL | Jump on Low | See BL |
| JNC | Jump on No Carry | See BNC |
| LA | Load Address | Generates sequence LIH, TRA, LIL |
| LRD | Load Reg. and Decrement | Same as LDR instruction |
| LIH | Load Immed. High | Uses high byte of constant in LI address field |
| LIL | Load Immed. Low | Uses low byte of constant in LI address field |
| NOP | No Operation | Dummy instruction - skipped |
| RAL | Rotate and Add Left | Generates sequence SHL, IC, AI |
| SHLM | Shift Left Multiple | Shifts specified number of times to left |
| SHRM | Shift Right Multiple | Shifts specified number of times to right |
| SRG | Set Register Group | Same as GI |
| TPB | Test & Preserve Bit | Generates sequence LB, TP |
| TRB | Test & Reset Bit | Generates sequence LB, TR, STB |
| TRMB | Test & Reset Multiple Bits | Same as TRB but specifies multiple bits |
| TS | Test and Set | Same as OI instruction |
| TSB | Test & Set Byte | Same as TS but byte is specified in addition to bit |
| TSMB | Test & Set Multiple Bytes | Same as TS but specified multiple Bits |

Notes:
(Label) DC* causes the present location (*) to be associated with the label.
L and H, in general, are suffixes indicating low or high byte when 16 bit operands are addressed.

TABLE I
APPENDIX B

| LOC | OBJ | OP1 | OP2 | | SOURCE STATEMENT | |
|---|---|---|---|---|---|---|
| | | | | BEGIN DRIVE START | | |
| | | 36FA | | ORG | CMDST | |
| | | | | STIME | CDTSRPD1,6,CDMSG17 | SET PROTECTION TIMER |
| 3702 | A98E | 008E | | *GI | CDTSG0E+CDMIM80 | |
| 3704 | AEFF | FFCF | | *LIH | X'FFFF'-(6*8) | |
| 3706 | 29 | | | *TRA | | |
| 3707 | AECF | FFCF | | *LIL | X'FFFF'-(6*8) | |
| 3709 | 84 | 0004 | | *STR | CDTSRPD1 | |
| 370A | A6DC | 00DC | | *LB | CDTSBC2 | |
| 370C | AF01 | 0000 | | *TS | CDTSIC20 | |
| 370E | A1DC | 00DC | | *STB | CDTSBC2 | |
| 3710 | A917 | 0017 | | *GI | CDMSG17+CDMIM00 | |
| 3717 | A6A7 | 00A7 | | TPB | CDSCBS0,CDSCIS00 | 6% REDUCTION? |
| 3719 | 90 | 0000 | | | | |
| 371A | 3D23 | 3723 | | BZ | CMPDST1 | |
| 371C | AE02 | 0002 | | LI | P(CDPDIC91) | |
| 371E | 2719 | 0019 | | OUT | CDPDAC9 | MUST OUT 6% & ACC SEPARATELY |
| 3720 | AE82 | 0082 | | LI | P(CDPDIC97, CDPDIC91) | OUT ACC COMMAND/6% |
| 3722 | 05 | 3725 | | J | CMPDST2 | |
| | | 3723 | | CMPDST1 LI | P(CDPDIC97) | OUTPUT ACC COMMAND |
| 3723 | AE80 | 0080 | | | | |
| | | 3725 | | CMPDST2 OUT | CDPDAC9 | |
| 3725 | 2719 | 0019 | | | | |
| | | 3727 | | WAIT | PD | WAIT ON PD UP-TO-SPEED |
| 3727 | 317E5A | 0001 | 5A7E | *BAL | CDPDRPTR,CMPDEND | |
| | | 372A | | WAIT | PD,T=(0,500) | WAIT ON SPEED TO STAB. |
| 372A | A98F | 008F | | *GI | CDTSF0F+CDMIM80 | |
| 372C | AEFF | FFCD | | *LIH | X'FFFF'-(500/10) | |

TABLE I-continued

APPENDIX B

| LOC | OBJ | OP1 | OP2 | SOURCE STATEMENT | | |
|---|---|---|---|---|---|---|
| 372E | 29 | | | *TRA | | |
| 372F | AECD | FFCD | | *LIL | X'FFFF'-(500/10) | |
| 3731 | 86 | 0006 | | *STR | CDTSRPD0 | |
| 3732 | A6EC | 00EC | | *LB | CDTSBC3 | |
| 3734 | AF40 | 0006 | | *TS | CDTSIC36 | |
| 3736 | A1EC | 00EC | | *STB | CDTSBC3 | |
| 3738 | A917 | 0017 | | *GI | CDMSG17+CDMIM00 | |
| 373A | 317E5A | 0001 | 5A7E | *BAL | CDPDRPTR,CMPDEND | |
| 375C | AE08 | 0008 | | LI | P(CDPDICA3) | REFERENCE ENABLE |
| 375E | 271A | 001A | | OUT | CDPDACA | |
| | | | 3760 | WAIT | PD | WAIT ON REFERENCE TO ZERO |
| 3760 | 317E5A | 0001 | 5A7E | *BAL | CDPDRPTR,CMPDEND | |
| 3763 | AE20 | 0020 | | LI | P(CDPDICA5) | ENABLE LOA |
| 3765 | 271A | 001A | | OUT | CDPDACA | |
| | | | | RTIME | CDTSRPD1,CDMSG17 | RESET PROTECTION TIMER |
| 376B | A98E | 008E | | *GI | CDTSGOE+CDMIM80 | |
| 376D | A6DC | 00DC | | *LB | CDTSBC2 | |
| 376F | B0 | 0000 | | *TR | CDTSIC20 | |
| 3770 | A1DC | 00DC | | *STB | CDTSBC2 | |
| 3772 | 25 | | | *CLA | | |
| 3773 | 84 | 0004 | | *STR | CDTSRPD1 | |
| 3774 | A917 | 0017 | | GI | CDMSG17+CDMIM00 | |
| 3949 | A6E6 | 00E6 | | LB | CDCRBS0 | SPEED CODE FLAG BYTE |
| 394B | 2715 | 0015 | | OUT | CDCRAC5 | |
| 394D | AE20 | 0020 | | LI | X'20' | CARRIAGE START |
| 394F | 2716 | 0016 | | OUT | CDCRAC6 | |
| | | | | FIN | END | RETURN TO SUPERVISOR |

(*Macro Expansion)

TABLE II

APPENDIX B

| STMT. # | | SOURCE STATEMENT | | |
|---|---|---|---|---|
| | | START OF EOL PROCESS | | |
| | | ORG | ZZDI | |
| 500 | ZZDI1 | LA | X'850' | STD LINE CNT FOR PRINT |
| 600 | | STR | CDDIRCNT | SAVE LINE COUNT |
| 800 | ZZDI10 | WAIT | PS | WAIT ON EOL IRQ |
| | | | | IS THIS THE LAST LINE? |
| 1000 | ZZDI11 | LRD | CDDIRCNT | |
| 1100 | | LA | X'0001' | |
| 1200 | | SR | CDDIRCNT | |
| 1300 | | BE | ZZDI1C | THEN; GO TO OUTPUT LAST LINE |
| 1400 | | TPB | CDDIBS1,CDDIIS16 | ELSE; CK FOR NO DATA READY |
| 1500 | | BE | ZZDI10 | DATA RDY, GO WAIT ON EXT EOL |
| 1700 | ZZDI12 | LI | X'20' | DATA NOT READY |
| 1800 | | OUT | CDPSACE | OUT: STOP ON EOL COMMAND |
| 1900 | | WAIT | PS | WAIT ON NEXT EOL IRQ AFTER STOP |
| 2000 | ZZDI13 | TPB | CDDIBS1,CDDIIS16 | IS DATA READY YET? |
| 2100 | | BZ | ZZDI14 | YES |
| 2200 | | WAIT | PS,T=(0.1000) | NO; 1 SEC DELAY |
| 2300 | | J | ZZDI13 | |
| 2400 | ZZDI14 | LI | X'10' | |
| 2500 | | OUT | CDPSACE | OUT: CARRIAGE START |
| 2600 | | B | ZZDI10 | GO WAIT ON NEXT EOL |
| 2800 | ZZDI1C | LI | X'4' | JUMP TO HERE FOR EOP |
| 2900 | | OUT | CDPSACE | OUT: LAST LINE |
| 3000 | | WAIT | PS | WAIT FOR LAST EOL IRQ |
| 3200 | | ACT | CMCRPR | CARRIER HOME POSITIONING ROUTINE |
| 3300 | | ACT | CMPDSP | PRINTER DRIVE STOP ROUTINE |
| 3400 | | FIN | END | RETURN TO SUPERVISOR |

TABLE III

APPENDIX B

| LOC | OBJ | OP1 | OP2 | SOURCE STATEMENT | | |
|---|---|---|---|---|---|---|
| | | | | BEGIN PRINT DRIVE STOP | | |
| | | 37CA | | ORG | CMPDSP | |
| | | | | STIME | CDTSRPD1,6,CDMSG17 | SET PROTECTION TIMER |
| 37D2 | A98E | 008E | | *GI | CDTSGOE+CDMIM80 | |
| 37D4 | AEFF | FFCF | | *LIH | X'FFFF'-(6*8) | |
| 37D6 | 29 | | | *TRA | | |
| 37D7 | AECF | FFCF | | *LIL | X'FFFF'-(6*8) | |
| 37D9 | 84 | 0004 | | *STR | CDTSRPD1 | |
| 37DA | A6DC | 00DC | | *LB | CDTSBC2 | |
| 37DC | AF01 | 0000 | | *TS | CDTSIC20 | |

TABLE III-continued
APPENDIX B

| LOC | OBJ | OP1 | OP2 | SOURCE STATEMENT | | |
|---|---|---|---|---|---|---|
| 37DE | A1DC | 00DC | | *STB | CDTSBC2 | |
| 37E0 | A917 | 0017 | | *GI | CDMSG17+CDMIM00 | |
| 37E7 | AE40 | 0040 | | LI | P(CDPDIC96) | |
| 37E9 | 2719 | 0019 | | OUT | CDPDAC9 | OUTPUT DECELERATE COMMAND |
| 37EB | AE08 | 0008 | | LI | P(CDPDICA3) | |
| 37ED | 271A | 001A | | OUT | CUPDACA | OUTPUT REF ENABLE |
| | | 37F6 | | WAIT | PD | WAIT ON PD RVS IRQ |
| 37F6 | 317E5A | 0001 | 5A7E | *BAL | CDPDRPTR,CMPDEND | |
| | | | | RTIME | CDTSRPD1,CDMSG17 | RESET PROTECTION TIMER |
| 37F9 | A98E | 008E | | *GI | CDTSGOE+CDMIM80 | |
| 37FB | A6DC | 00DC | | *LB | CDTSBC2 | |
| 37FD | B0 | 0000 | | *TR | CDTSIC20 | |
| 38FE | A1DC | 00DC | | *STB | CDTSBC2 | |
| 3800 | 25 | | | *CLA | | |
| 3801 | 84 | 0004 | | *STR | CDTSRPD1 | |
| 3802 | A917 | 0017 | | *GI | CDMSG17+CDMIM00 | |
| | | | | FIN | END | RETURN TO SUPERVISOR |

(*Macro Expansion)

What is claimed is:

1. In a facsimile system, apparatus for restarting a scanning carriage in the middle of scanning an image without overlapping or splitting the image when the scan operation is interrupted and restarted, said apparatus comprising:
means for generating false, line reference signals having a fixed frequency relationship to the actual line reference signals for the image being scanned;
means for synchronizing the movement of the carriage to the false, line reference signals;
means for storing the synchronization conditions existing at the time of the interrupt; and
means connected to said storing means for resynchronizing the carriage upon restart to the synchronization conditions stored by said storing means at the time of interrupt.

2. The apparatus of claim 1 wherein:
said storing means stores the line position of the carriage at the time of interrupt.

3. The apparatus of claim 2 wherein:
said resynchronizing means, upon restart, brings the carriage up to scan speed before the carriage reaches the line position where interrupt occurred and indicates when the carriage is again at that line position.

4. The apparatus of claim 3 wherein:
said generating means generates a false, line reference signal that varies cyclicly with the actual line reference signal.

5. The apparatus of claim 4 wherein:
said storing means also stores the relationship between the false reference signal and the actual reference signal at the time of interrupt.

6. The apparatus of claim 5 wherein:
said resynchronizing means, upon restart, also brings the carriage into phase synchronization with the false reference signal and restores the relationship between the false reference signal and the actual reference signal, that existed at the time of interrupt, as stored in said storing means.

7. The apparatus of claim 1 wherein:
said generating means generates a false, line reference signal that varies cyclicly with the actual line reference signal.

8. The apparatus of claim 7 wherein:
said storing means stores the relationship between the false reference signal and the actual reference signal at the time of interrupt.

9. The apparatus of claim 8 wherein:
said resynchronizing means, upon restart, brings the carriage into phase synchronization with the false reference signal and restores the relationship between the false reference signal and the actual reference signal, that existed at the time of interrupt, as stored in said storing means.

10. In a facsimile system having a linearly moving print head and a rotary print drum resynchronization apparatus for the print head drive to restore the print head, after an interrupt, to the same operative conditions with the print drum at the next print position occurring after the position last printed when the interrupt occurred, said apparatus comprising:
means for generating a fake once-around signal having a fixed frequency relationship to the real once-around for the print drum;
means for dividing the read once-around into an integer number of reference positions within each real once-around;
means for synchronizing said print head drive to said fake once-around signal so that the movement of the head has a known relationship to the real once-around;
means connected to said dividing means for storing the relationship between the fake once-around signal and the real once-around at the time of interrupt; and
said synchronizing means connected to said storing means for synchronizing upon restart, said print drive to a reset fake once-around signal, said reset fake once-around signal has the same relationship to the real once-around that existed between the fake once-around signal and the real once-around during the interrupt whereby the print head returns to the same operating condition for restart that existed at the time of interruption.

11. The apparatus of claim 10 wherein said print head drive comprises:
means for moving the print head at a predetermined speed across the page being printed;
means for monitoring the position of the print head; and
said moving means connected to said monitoring means for moving the print head, upon restart, at the same speed and in the same direction through the last printed position.

12. The apparatus of claim 10 wherein:
said generating means generates a fake once-around signal whose frequency is not an integral multiple of the real once-around frequency.

13. The apparatus of claim 12 wherein said storing means comprises:
register means connected to said dividing means for storing a target count representing the position of the fake once-around within the real once-around at the time of interrupt; and
means connected to said generating means for loading the count from said dividing means into said register means upon the occurrence of the fake once-around signal at the time of interrupt.

14. The apparatus of claim 13 wherein said synchronizing means includes:
means for comparing, upon restart, the count in said dividing means to the count stored in said register means and generating a reset signal when the counts are equal; and
means responsive to the reset signal for resetting said generating means to force generation of the fake once-around signal at the same time relative to the real once-around as occurred during interrupt.

15. The apparatus of claim 14 wherein said print head drive comprises:
means for moving the print head at a predetermined speed across the page being scanned;
means for monitoring the position of the print head; and
said moving means connected to said monitoring means for moving the print head, upon restart, at the same speed and in the same direction through the last printed position.

16. The apparatus of claim 10 wherein said storing means comprises:
register means connected to said dividing means for storing a target count representing the position of the fake once-around within the real once-around at the time of interrupt; and
means connected to said generating means for loading the count from said dividing means into said register means upon the occurrence of the fake once-around signal at the time of interrupt.

17. The apparatus of claim 16 wherein said synchronizing means includes:
means for comparing, upon restart, the count in said dividing means to the count stored in said register means and generating a reset signal when the counts are equal; and
means responsive to the reset signal for resetting said generating means to force generation of the fake once-around signal at the same time relative to the real once-around as occurred during interrupt.

18. A method for restarting a facsimile machine without overlapping or splitting the facsimile image when an interrupt occurs during the scanning of a page by a scanner, comprising the steps of:
moving the scanner across the page line by line;
generating a fake line reference having a relationship that varies cyclicly with an actual line reference;
synchronizing the movement of the scanner to the fake reference signal;
storing the relationship between the fake reference and the actual reference at the time of the interrupt; and
restoring the sync relationship between movement of the scanner and the fake reference, said fake reference having the same relationship to the actual reference as that stored during said storing step at the time of interrupt, said restoring accomplished prior to the scanner reaching the last position scanned before interrupt.

19. The method of claim 18 wherein said storing step comprises the steps of:
dividing each cycle of the actual reference into counts; and
storing the divided count corresponding to the position of the fake reference inside the actual reference cycle during the interrupt.

20. The method of claim 19 wherein said restoring step includes the step of:
forcing the fake reference to occur, upon restart, at the position within the actual reference cycle as stored by said storing step.

21. The method of claim 18 and in addition the steps of:
monitoring the line position of the scanner as it moves relative to the page;
backing up the scanner to a rest position over an area of the page already scanned; and
accelerating the scanner, upon restart, forward up to scanning speed prior to the scanner reaching the last position scanned before interrupt.

22. The method of claim 21 wherein said storing step comprises the steps of:
dividing each cycle of the actual reference into counts; and
storing the divided count corresponding to the position of the fake reference inside the actual reference cycle during the interrupt.

23. The apparatus of claim 22 wherein said restoring step includes the step of:
forcing the fake reference to occur, upon restart, at the position within the actual reference cycle as stored by said storing step.

* * * * *